L. N. BEAUCHEMIN.
HORSESHOE.
APPLICATION FILED APR. 15, 1907.
902,800.
Patented Nov. 3, 1908.
2 SHEETS—SHEET 1.
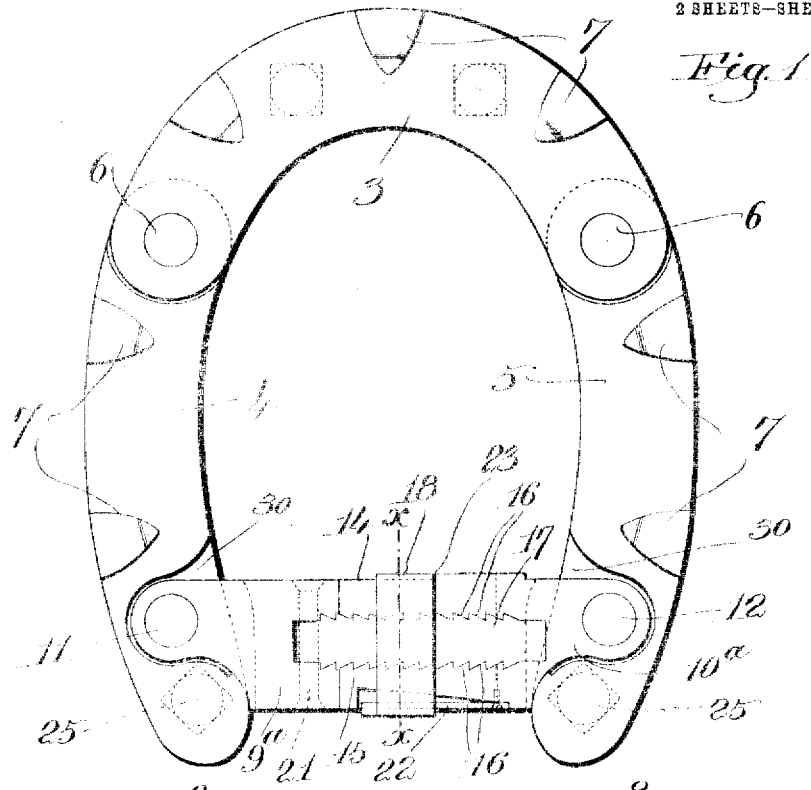
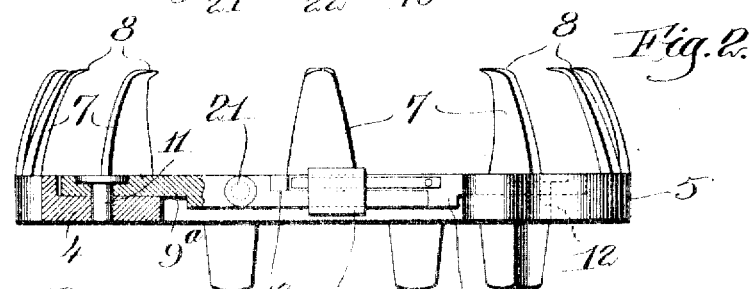
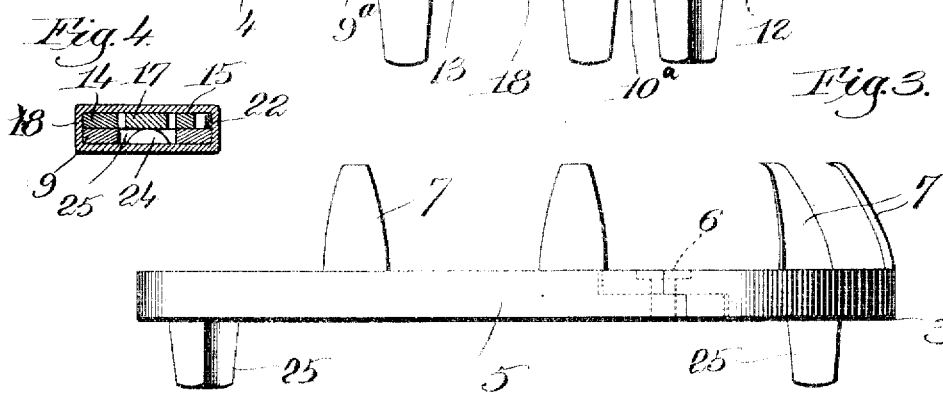
Witnesses.
Thomas J. Drummond
Joseph M. Ward
Inventor.
Louis N. Beauchemin,
by Beverly Guyon atty's L. N. BEAUCHEMIN.
HORSESHOE.
APPLICATION FILED APR. 15, 1907
902,800.
Patented Nov. 3, 1908.
2 SHEETS—SHEET 2.
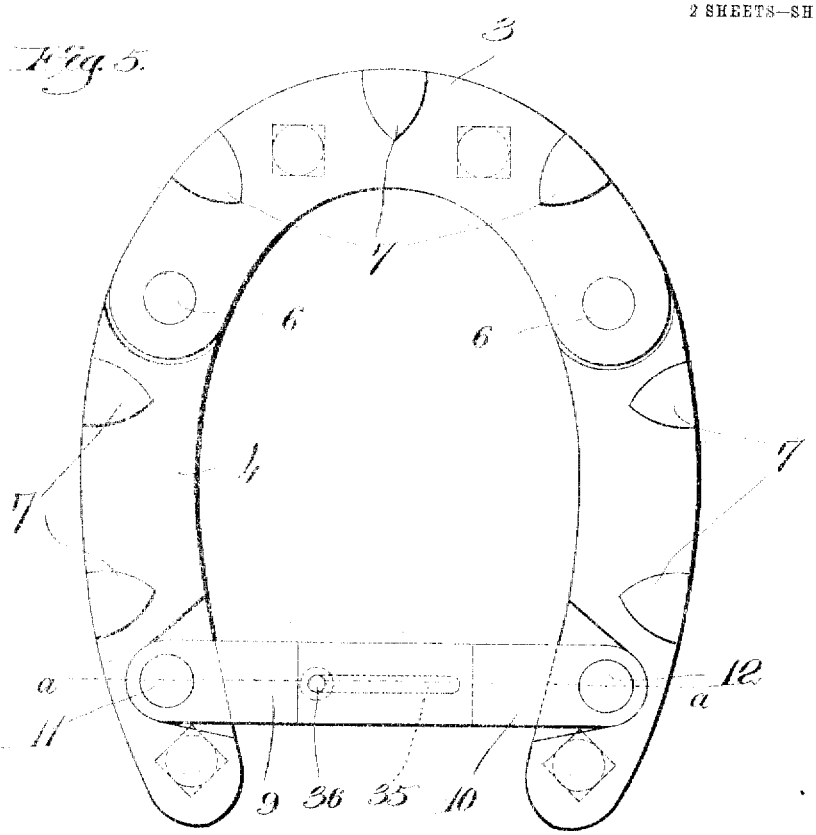
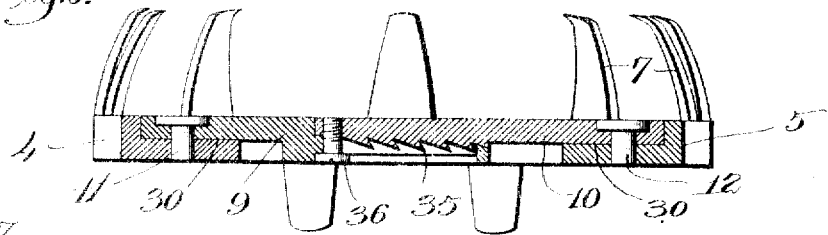
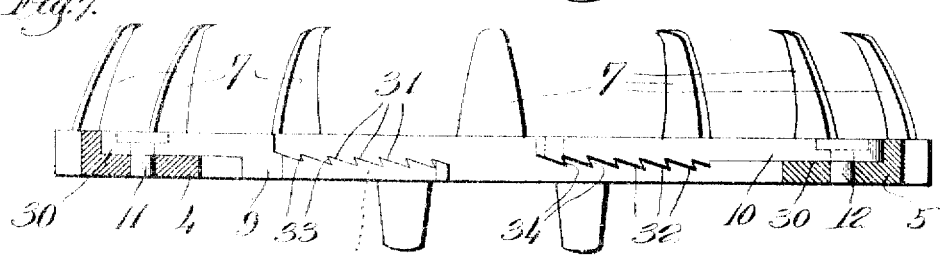

UNITED STATES PATENT OFFICE.

LOUIS N. BEAUCHEMIN, OF MONTREAL, QUEBEC, CANADA, ASSIGNOR OF ONE-HALF TO G. HERBERT SIMPSON AND ONE-HALF TO JOHN AUGUSTINE MANN, OF MONTREAL, CANADA.

HORSESHOE.

No. 902,800.　　　Specification of Letters Patent.　　　Patented Nov. 3, 1908.

Application filed April 15, 1907. Serial No. 368,170.

*To all whom it may concern:*

Be it known that I, LOUIS NAPOLEON BEAUCHEMIN, a subject of the King of Great Britain, residing in the city and district of Montreal, Province of Quebec, Canada, have invented an Improvement in Horseshoes, of which the following description, in connection with the accompanying drawing, is a specification, like letters on the drawing representing like parts.

This invention relates to that class of horseshoes which are commonly known as "nailless" horseshoes, that is, horseshoes which are adapted to be secured upon the feet of horses without the use of nails.

One form of this class of horseshoes has heretofore been made in two parts which are pivoted together at the toe of the shoe, each part having spurs projecting upwardly therefrom to embrace the hoof of the horse, and the shoe has been attached to the hoof by drawing together the heel ends of the shoe and securing them to each other by suitable locking means. One disadvantage of this construction is that in fastening the shoe upon the hoof the sides of the shoe pinch or clamp the forepart of the hoof too tightly owing to the fact that the two parts of the shoe are pivoted together at the front thereof.

My present invention aims to obviate this disadvantage by providing a construction in which the clamping of the shoe occurs at the heel of the hoof only without pinching or injuring the toe part thereof. To accomplish this object I make the shoe in three parts, which comprises a rigid toe or front piece which encircles the front of the hoof, and two side pieces pivoted to the ends of front piece whereby when the shoe is placed on the hoof the clamping occurs at the sides of the hoof only and not at the forepart thereof.

My invention also includes a novel locking device for connecting together the two side pieces of the hoof without the use of bolts or nuts.

Figure 1 is a plan view of a horseshoe embodying my invention; Fig. 2 is a rear elevation thereof; Fig. 3 is a side view; Fig. 4 is a section on the line *x—x*, Fig. 1; Fig. 5 is a plan view of a horseshoe showing the preferred embodiment of my invention; Fig. 6 is a section on the line *a—a*, Fig. 5; Fig. 7 is a rear view of the shoe showing the side pieces spread.

The shoe comprises the forepart 3 and the two side pieces 4 and 5. The side pieces are pivoted to the ends of the forepart in any suitable way, as at 6, so that said side pieces can be moved toward and from each other. The side pieces and forepart have extending upwardly therefrom spurs 7 which are adapted to overlie the hoof and which are adapted to be bent at their upper ends to form securing points 8 by means of which they are held in engagement with the hoof.

For clamping the shoe to the hoof I provide two locking members one pivoted to each of the side pieces 4 and 5 near the heel of the shoe, and construct said locking members so that they will have interlocking engagement with each other.

In the embodiment shown in Figs. 4 and 5, 9 and 10 are the two locking members, the member 9 being pivoted to the heel of the side piece 4 and the member 10 being pivoted to the heel of the side piece 5 as at 11 and 12.

I prefer to form each side piece with a recess 30 in which the end of the locking member is pivoted so that the surface of the locking member will stand flush with the surface of the shoe.

The locking member 9 is provided with teeth 31 which are adapted to engage other teeth 32 formed on the locking member 10. The faces 33, 34, of the teeth 31 and 32 are preferably inclined slightly, as best seen in Fig. 6, so that said teeth will have a firm hold on each other when they are in interlocking engagement.

In constructing the horseshoe as shown in Figs. 5 and 6 I prefer to make the locking members 9 and 10 so that they normally stand in the same plane as shown in Fig. 7. The result is that when said locking members are in interlocking engagement, as shown in Figs. 5 and 6, the resiliency of the locking members holds the teeth firmly in engagement. As an added precaution however I may employ some locking device to maintain these locking members in engagement, such for instance as a screw 36 which passes through a slot 35 in the member 9 and is screw-threaded into the member 10. In applying a horseshoe of this form to a hoof the two side pieces 4 and 5 are spread, as shown in Fig. 7, and the shoe is then placed on the hoof, the side pieces 4 and 5 are then swung inwardly toward each other until the spurs 7 thereon firmly grip the sides of the hoof. This inward swinging movement of the side pieces causes the locking members 9 and 10 to slide over each other, and the resiliency of said members holds the teeth 31, 32, in engagement with each other.

When the shoe is tightly clamped to the hoof the screw 36 or other locking device may be placed in position thus firmly holding the members 9 and 10 in interlocking engagement.

In Figs. 1, 2 and 4 I have shown another embodiment of my invention. In this embodiment the two side pieces 4 and 5 are held together by two locking members 9$^a$ and 10$^a$ which are pivoted to the side pieces at 11 and 12 respectively.

The member 9$^a$ is shown as cut away on its upper surface, as at 13, to receive the member 10$^a$, as best seen in Fig. 2. Said member 10$^a$ is made with the two arms 14 and 15 which are provided on their inner faces with teeth or notches 16, and pivoted to the member 9$^a$, as at 21, is a locking strip 17 which is provided on its sides with teeth adapted to engage the teeth 16 of the member 10$^a$.

18 is a locking slide which encircles the members 9$^a$ and 10$^a$ and is slidably mounted thereon. The member 9$^a$ is preferably provided with an opening 25 beneath the locking strip 17 through which the latter may be swung when it is desired to disconnect the members 9$^a$ and 10$^a$ and the keeper 18 is shown as having a projection or rest 24 which is received in the opening 25 and on which the locking strip 17 rests, as shown in Fig. 4. When the keeper 18 is moved backwardly or to the left, Figs. 1 and 2, the locking strip 17 may be swung out of engagement with the member 10$^a$ thereby unlocking the member 9$^a$ from the member 10$^a$.

In applying my improved horseshoe to a horse's hoof, the shoe is placed on the hoof with the forepart 3 in proper position, and the side pieces 4 and 5 are then swung inwardly to cause the shoe to be clamped to the horse's hoof, and when said side pieces are properly adjusted the locking strip 17 is swung down into locking engagement with the teeth 16 on the member 10$^a$ and thereafter the keeper 18 may be moved to the right, Figs. 1 and 2 into the position shown in said figures. In moving into this position the keeper slides over the end of the member 10$^a$ thus locking the members 9$^a$ and 10$^a$ together, and also slides over the locking strip 17 thereby holding it in locking engagement with the member 10$^a$. The keeper 18 may be held in its adjusted position by any suitable means, such as a spring catch 22, carried by the member 10$^a$.

I have herein shown the member 10$^a$ as provided with a shoulder 23 which serves to limit the movement of the keeper.

It will be noted that in applying the shoe to the hoof the forepart of the hoof is not pinched as would be the case if the shoe were jointed at the forepart, and that the only portion of the hoof which is subjected to lateral pressure is the heel portion.

Furthermore, it will be noted that the locking device shown can be operated without the use of bolts or nuts, and hence the shoe may be put on or taken off without the use of any special implement.

I would also call attention to the fact that the side pieces 4 and 5 of the shoe extend back beyond the pivots 12 sufficiently so that removable calks may be used.

While I have illustrated herein some embodiments of my invention I wish it understood that I have not attempted to show all forms in which the invention might be embodied.

Having described my invention what I claim as new and desire to secure by Letters Patent is:—

1. A horseshoe comprising a forepart, two side pieces hinged thereto, a recessed locking member pivoted to one of said side pieces and provided with beveled teeth, a bifurcated locking member pivoted to the other of said side pieces and adapted to be seated within the recess of the first named locking member and provided with inclined teeth adapted to interlock with the teeth of the said first named locking member, and means for maintaining the interlocked position of the teeth of said locking members.

2. A horseshoe comprising a forepart, two side pieces hinged thereto, a recessed locking member pivoted to one of said side members, a locking strip pivoted to said locking member and provided with inclined teeth, a bifurcated locking member pivoted to the other of said side pieces and adapted to be seated in the recess of the first locking member and provided with inclined teeth adapted to interlock with the teeth of the locking strip, and means for holding said parts in interlocked position.

In testimony whereof, I have signed my name to this specification, in the presence of two subscribing witnesses.

L. N. BEAUCHEMIN.

Witnesses:
Louis C. Smith,
J. David Renton.